United States Patent Office 3,761,438
Patented Sept. 25, 1973

3,761,438
AQUEOUS SURFACE-ACTIVE COMPOSITIONS BASED ON COPOLYMERS OF METHYL VINYL ETHERS
Herman S. Schultz, Easton, Pa., assignor to GAF Corporation, New York, N.Y.
No Drawing. Filed Apr. 2, 1971, Ser. No. 130,761
Int. Cl. C08f 45/24
U.S. Cl. 260—29.6 R         4 Claims

ABSTRACT OF THE DISCLOSURE

Copolymers of methyl vinyl ether with alkyl vinyl ethers having 2–8 carbon atoms in the alkyl moiety are disclosed. Such copolymers, prepared by using a cationic catalyst system, have excellent surfactant properties in aqueous systems.

FIELD OF THE INVENTION

This invention relates to aqueous suspensions or dispersions based on water-dispersible or soluble copolymers of methyl vinyl ether with higher alkyl vinyl ethers having surface-active properties.

BACKGROUND OF THE INVENTION

It is well known that alkyl vinyl ethers such as ethyl, isopropyl, tert. butyl, cetyl vinyl ethers and the like may be homopolymerized by the use of acid-reacting catalysts to produce from viscous liquid to solid polymer products essentially insoluble in water at any temperature. Poly-(methyl vinyl ether) can be similarly synthesized to give an amorphous or partly crystalline product which is soluble in water at ice temperature to ordinary room temperature and precipitates from dilute aqueous solutions above 32° C.

SUMMARY OF THE INVENTION

When methyl vinyl ether is copolymerized with one or more higher alkyl vinyl ethers using a cationic catalyst system such as $BF_3$-diethyl etherate in 1,4-dioxane, copolymers are obtained, characterized by unexpected and unique surface-active properties in aqueous systems.

It is, therefore, an object of the present invention to provide a new and useful class of compositions based on copolymers of methyl vinyl ether which display surface-active properties in aqueous liquid-liquid, solid-liquid, and gas-liquid systems. The above object is accomplished by copolymerization of methyl vinyl ether with alkyl vinyl ethers in which the alkyl group contains from 2 to 8 carbon atoms by means of a cationic catalyst system at temperatures ranging from −80° C. to about 60° C. Copolymers having the desired hydrophilic-hydrophobic characteristics for a specific interface system with water are prepared by the control of comonomer ratios, molecular weight, reaction temperatures, and solvent, together with an appropriate cationic catalyst system that yields the desired products.

On copolymerizing the methyl vinyl ether with an alkyl vinyl ether in which the alkyl contains from 2 to 8 carbon atoms, it is desirable that the comonomers be in a high state of purity and substantially anhydrous. The copolymerizations may be carried out in stirred reactors or in crown-capped bottles equipped with a perforated crown cap and self-sealing crown cap liner or septum.

The range of wt. percent comonomer with methyl vinyl ether varies depending on the length of the alkyl chain. For example:

| Wt. percent range | Alkyl of the vinyl ether |
|---|---|
| 3–35 | Ethyl |
| 1–20 | Butyl |
| ½–10 | Octyl |

Mixtures of alkyl vinyl ethers may also be employed as comonomers with the methyl vinyl ether. The alkyl groups may be branched or linear.

The molecular weight of the copolymers of this invention should range from those giving intrinsic viscosities at 0.1% solution in benzene (25° C.) ranging from 0.1 to 7.5.

The molecular weight of the copolymers of this invention is best and most conveniently determined from the intrinsic viscosity of the copolymer. The inherent viscosity is related to the molecular weight according to the Mark-Houwink equation (see Makromoleculare Chemie, vol. 37, pages 187–197, 1960):

$$[\zeta] = 7.6 \times 10^{-4} M^{0.60}$$

wherein $[\zeta]$ = intrinsic viscosity and M = molecular weight for measurements in benzene. The inherent viscosity at 0.1% concentration is very close to the intrinsic viscosity and only slightly smaller. Thus, $$\zeta_{inh} = \frac{2.303 \log \zeta \text{ rel}}{C}$$

wherein C = grams of polymer per 100 cc. solution, $\zeta_{rel}$ = relative viscosity and $$[\zeta] = \lim \zeta_{c \to 0}^{inh}$$

In general, although the polymerization reaction will start at different temperatures with different catalysts, it is preferred to carry out the polymerization reaction under anhydrous conditions at temperatures in the range of −80 to +15° C.

The polymerization reaction is best conducted in solution, particularly in solutions of aromatic hydrocarbons such as benzene and toluene provided they are liquid at the reaction temperatures. The reaction may also take place in liquid solutions of alkyl ethers, including diethyl ether, dibutyl ether, dioxane and 1,4-dioxane; and those chlorinated hydrocarbons which are liquid and inert to the reaction at the reaction temperatures.

The reaction media, as well as the reactants, must be rendered completely anhydrous, before initiation of the reaction, for example, by treatment with metallic sodium in lump or ribbon form.

As the catalyst system, a boron trifluoride-etherate complex may be employed such as $BF_3$-dethyl etherate, $BF_3$-dibutyl etherate, $BF_3$-1,4-dioxane etherate and the like, dissolved for example, in 1,4-dioxane, simple ethers and toluene.

The methyl vinyl ether copolymers, in accordance with the present invention, are soluble or dispersible in water and/or the second non-aqueous phase in a concentration ranging from 0.001% to about 10% by weight at ice temperature to about normal ambient temperature at which the surface-active properties are displayed. Their cloud points in aqueous systems as 1% solution concentration range from about 5° C. to 32° C.

In view of their surface-active properties, the subject copolymers can be used as components of compositions that act as dispersing agents or suspending surfactants, foaming agents, emulsifiers, wetting agents, protective colloids, latex stabilizers, flotation (ores) agents, foam stabilizers, anti-soil redeposition agents, latex coagulants, oil-in-water emulsifiers or dispersants, water-in-oil dispersants. The surface-active properties may also be employed in compositions in conjunction with more conventional surface-active agents, for example, ethoxylated phenols, ethoxylated alcohols, alkyl and aryl sulfates, alkyl and aryl sulfonates, including surface-active polymers, to give enhanced properties and solubility in specific aqueous systems.

The following examples will show how the water-soluble or water-dispersible copolymers of this invention of methyl vinyl ether with the alkyl vinyl ethers are prepared and how their surface-active properties were determined. Unless otherwise stated, all parts are by weight. Where specific components are noted, it is to be realized that they are merely exemplary and that their equivalents as set forth above may be substituted.

EXAMPLE 1

The copolymerization procedure was carried out in a carefully cleaned bottle, equipped with perforated crown cap and a self-sealing crown cap liner, i.e., a cleaned citrate of magnesia bottle. The clean bottle was alternately evacuated and filled with nitrogen on a vacuum manifold several times with intermittent warming with a hot-air gun. The reactor (bottle) was capped in a dry nitrogen-filled dry box (or glove box). Into the nitrogen-filled and capped reactor bottle, there was carefully introduced by way of a hypodermic needle, 26.9 grams of methyl vinyl ether, which had been previously purified and dried over sodium ribbon. The technique for transferring the methyl vinyl ether to the reaction bottle involved vaporizing the monomer from its storage vessel through a closed, initially evacuated system and condensing the vapors at a lower temperature (0° to —10° C.) through the hypodermic needle which had been previously injected into the reaction bottle.

To the cooled reactor bottle there was then injected, by way of the hypodermic needle, 80.7 cc. of purified and dried toluene and 1.76 cc. of purified and dried ethyl vinyl ether solution in toluene (0.189 g./cc. solution) and the reactor bottle shaken to effect solution of the comonomers. The reactor bottle was then placed into a Dry Ice-acetone bath at a temperature of —78° C. and into it there was injected, by means of a hypodermic needle, 0.96 cc. of a catalyst solution which comprises 0.104 gram of boron trifluoride-diethyl etherate per cc. of solution thereof in 1,4-dioxane. It is to be noted that both the diethyl etherate and the dioxane used to prepare the catalyst solution had been previously highly purified. The 1,4-dioxane was dried over sodium ribbon. The reactor bottle was equipped with a device which made it possible to keep a flowing nitrogen atmosphere over the crown caps thereof so as to facilitate the injection of reagents with a hypodermic syringe, in an essentially moisture and air-free condition.

Immediately after the injection of the catalyst solution, the reactor bottle was given a quick shake and then permitted to remain overnight, about 20 hours. On the following day, methanolic ammonia was injected into the reactor bottle to quench the reaction, and several hundred cc. of purified and dried toluene added to yield a free-flowing solution. The reaction solution was then filtered through a sintered glass funnel to remove the catalyst complex and the filtrate pumped off under vacuum to remove the toluene.

The resulting polymer is a clear solid in a yield of 90% and having an inherent viscosity of 4.8 as a 0.1% solution in benzene, at 25° C.

EXAMPLE 2

Example 1 was repeated with the exception that the following proportions of reactants were employed:

26.6 grams of methyl vinyl ether
79.8 cc. of purified and dried toluene
8.73 cc. of purified and dried ethyl vinyl ether solution in toluene (0.189 g./cc.)
0.99 cc. of catalyst solution The inherent viscosity of the resulting copolymer (0.1% benzene at 25° C.) was 5.09.

EXAMPLE 3

Example 1 was again repeated with the exception that the following proportions of reactants were employed:

26.2 grams of methyl vinyl ether
78.6 cc. of purified and dried toluene
17.2 cc. of purified and dried ethyl vinyl ether solution in toluene (0.189 g./cc.)
1.02 cc. of catalyst solution The inherent viscosity of the resulting copolymer (0.1% benzene at 25° C.) was 4.86.

EXAMPLE 4

Example 1 was again repeated with the exception that the ethyl vinyl ether was omitted and the following reagents employed:

27.7 grams of methyl vinyl ether
83.1 cc. of purified and dried toluene
0.98 cc. of catalyst solution The inherent viscosity of the resulting copolymer (0.1% benzene at 25° C.) was 4.94.

Quantitative examination of water solutions of the product from Example 1, 2, 3 and 4 showed that on shaking, a heavier and larger foam formed in the solution of the product of Example 3. The aqueous solutions were prepared by chilling at close to ice temperature and this test was at about normal room temperature. Moreover, the foam in the solution from the product of Example 3 was much more stable than those of 1, 2 and 4. A 1% solution using a 1/1 blend of the product of Example 3 with Igepal CA–720 (ethoxylated nonyl phenol, GAF Corp.) showed an increase in dispersibility. On heating the solution, turbidity occurred at 50° C. but no precipitation.

EXAMPLE 5

This example was carried out in the same fashion as Example 1, with the exception that instead of the ethyl vinyl ether, 7.3 weight percent (relative to total monomers) of dried isobutyl vinyl ether was added to the methyl vinyl ether toluene solution and 0.15 mole percent (relative to total monomers) of a similar catalyst solution was used.

After the reaction at —78° C. overnight, the yield was 93.8% and the copolymer had an inherent viscosity (0.1% in benzene at 25° C.) of 3.51.

This copolymer, containing approximately 7 weight percent of isobutyl vinyl ether can be seen from Table 1 to give a very stable foam and good wetting ability.

The following Table 1 shows the surface-active property measurements of the copolymers of Example 1 to 5, with a comparison with water.

The cloud-point behavior was determined in 1% aqueous solution of the copolymers. The surface-tension data were obtained at 20°–25° C. in 0.1% solution of the copolymers. The Ross-Miles foam test and the Draves wetting test were both conducted at 20° C. in 0.10% solution.

TABLE 1

| Ex. No. | Cloud point 1% soln., °C. | Surface tension distilled water 20–25° C.; 1% soln., dynes/in. | Ross-Miles foam,[1] distilled $H_2O$ 0.1% solution | | Draves wetting [2] 0.1% soln. distilled $H_2O$ wetting out time (sec.) |
|---|---|---|---|---|---|
| | | | Initial | 5 min. | |
| 1 | 32 | 40.7 | 65 | 5 | >300 |
| 2 | 29 | 39.2 | 65 | 8 | 195 |
| 3 | 25 | 37.8 | 65 | 45 | 118 |
| 4 | 32 | 42.6 | 45 | 1 | >300 |
| 5 | 21 | 34.0 | 58 | 35 | 83 |
| Water | None | 72 | 0 | 0 | >8×10[4] |

[1] ASTM-D 1173–53 (reapproved 1965).
[2] AATCC-17-1952.

From Table 1, it is apparent that a homopolymer of methyl vinyl ether (Example 4) and a copolymer of approximately 99 weight percent of methyl vinyl ether and approximately 1 weight percent of vinyl ether (Example 1) have poor-wetting power (Draves test). As the weight percent of the ethyl vinyl ether in the copolymer increases to approximately 5 and 11 weight percent (Examples 2 and 3), the wetting power improves. The Draves test is carried out using cotton skein. The Ross-Miles foam test confirms the foam stability of the product of Examples 3 and 5.

EXAMPLE 6

This example was carried out in the same fashion as Example 1, with the main exception that the reaction was run at 0° C., 6.3 weight percent (relative to total monomers) ethyl vinyl ether (instead of the amount used in Example 1) was added to the methyl vinyl ether in toluene solution and 0.05 mole percent (relative to total monomers) of a similar catalyst solution was used. The inherent viscosity of the product at 0.1% in benzene at 25° C. is 1.14.

Qualitative experiments were carried out using a 1% solution in water to demonstrate useful surface-active property applications.

5 cc. of the 1% solution in water was mixed with an approximately equal amount of white petroleum jelly (Vaseline). The composition formed was a smooth emollient emulsion that had the tactile characteristics of a cold cream to the fingers and was apparently stable. Mixing 5 cc. water alone with an equal amount of petroleum did not result in an emulsion.

Equal amounts by weight of stearic acid and a 1% aqueous solution of the polymer mixed in a mortar and pestle resulted in thick, smooth, emulsified dispersion. Similar mixing with water, without the presence of the polymer, resulted in a fine suspension that separated Ervol white mineral oil formed an emulsion with an equal volume of a 1% aqueous solution of the polymer.

EXAMPLE 7

This example was carried out in the same fashion as Example 6, with the exception that instead of the stated amount of ethyl vinyl ether, 2 weight percent of butyl vinyl ether and 3 weight percent of ethyl vinyl ether were added to the methyl vinyl ether in toluene solution. The molecular weight and character of the amorphous product and its surface-active properties were similar to the product from Example 6.

EXAMPLE 8

This example was carried out in the same fashion as Example 6 with the exception that instead of the ethyl vinyl ether, 1½% by weight octyl vinyl ether was added to 98½% by weight of the methyl vinyl ether in toluene solution. The molecular weight and character of the amorphous product and its surface-active properties were similar to the product from Example 6.

It will be apparent to those skilled in the art from the preceding description, that certain changes may be made in the above procedures and compositions without departing from the scope of the invention. It is intended that the descriptive matter above shall be interpreted as illustrative and in no way limiting, since all equivalents within the scope of the disclosure may be substituted and such substitution is intended.

What is claimed is:

1. An aqueous suspension or dispersion consisting essentially of a water-dispersible copolymer of methyl vinyl ether with alkyl vinyl ethers wherein said alkyl group contains from 2 to 8 carbon atoms, said copolymers consisting essentially of from 99.5 to 65% by weight of methyl vinyl ether and from 0.5 to 35% by weight of said alkyl vinyl ether, said copolymer has an inherent viscosity in the range of about 0.1 to about 7.5 as measured in a 0.1% solution of benzene at 25° C.

2. An aqueous suspension or dispersion according to claim 1 comprising a water-dispersible copolymer consisting of 65 to 97% by weight of methyl vinyl ether and 3 to 35% of ethyl vinyl ether.

3. An aqueous suspension or dispersion according to claim 1 comprising a water-dispersible coploymer consisting of 80 to 99% by weight of methyl vinyl ether and 1 to 20% by weight of butyl vinyl ether.

4. An aqueous suspension or dispersion according to claim 1 comprising a water-dispersible copolymer consisting of 90 to 99.5% by weight of methyl vinyl ether and 0.5 to 10% by weight of octyl vinyl ether.

References Cited

UNITED STATES PATENTS

| | | | |
|---|---|---|---|
| 2,799,669 | 7/1957 | Zoss | 260—29.6 R |
| 2,884,396 | 4/1959 | Allegretti | 260—29.6 R |
| 3,023,198 | 2/1962 | Nowlin et al. | 260—29.6 R |
| 2,513,820 | 7/1950 | Schildknecht | 260—80.3 E |
| 2,549,921 | 4/1951 | Mosley | 260—80.3 E |
| 2,825,719 | 3/1958 | Herrle et al. | 260—80.3 E |

FOREIGN PATENTS

| | | | |
|---|---|---|---|
| 1,505,890 | 11/1967 | France | 260—80.3 E |

OTHER REFERENCES

Chemical Abstracts, Hagashimura et al., vol. 70, 1969, 47927t.

HAROLD D. ANDERSON, Primary Examiner

U.S. Cl. X.R.

252—352; 260—30.4 R, 33.2 R, 33.6 UA, 80.3 E